US011178353B2

United States Patent
Sherman et al.

(10) Patent No.: US 11,178,353 B2
(45) Date of Patent: Nov. 16, 2021

(54) SYSTEM AND METHOD FOR PROCESSING STREAMED VIDEO IMAGES TO CORRECT FOR FLICKER OF AMPLITUDE-MODULATED LIGHTS

(71) Applicant: Gentex Corporation, Zeeland, MI (US)

(72) Inventors: Tom B. Sherman, Ada, MI (US); Daniel G. McMillan, Zeeland, MI (US); Dale M. Radcliff, Hudsonville, MI (US); Igor Majdandzic, Holland, MI (US); Gregory S. Bush, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 609 days.

(21) Appl. No.: 15/189,371

(22) Filed: Jun. 22, 2016

(65) Prior Publication Data
US 2016/0373684 A1 Dec. 22, 2016

Related U.S. Application Data

(60) Provisional application No. 62/182,863, filed on Jun. 22, 2015.

(51) Int. Cl.
*G06F 15/00* (2006.01)
*H04N 5/58* (2006.01)
(Continued)

(52) U.S. Cl.
CPC .............. *H04N 5/58* (2013.01); *B60R 1/00* (2013.01); *G06K 9/00791* (2013.01);
(Continued)

(58) Field of Classification Search
CPC ........... G06T 1/20; G06T 15/005; G06T 1/60; G09G 5/363; G06F 3/14
(Continued)

(56) References Cited

U.S. PATENT DOCUMENTS 2,131,888 A 10/1938 Harris
2,632,040 A 3/1953 Rabinow
(Continued)

FOREIGN PATENT DOCUMENTS

EP 0513476 11/1992
EP 0899157 B1 10/2004
(Continued)

OTHER PUBLICATIONS

Palalau et al., "FPD Evaluation for Automotive Application," Proceedings of the Vehicle Display Symposium, Nov. 2, 1995, pp. 97-103, Society for Information Display, Detroit Chapter, Santa Ana, CA.
(Continued)

*Primary Examiner* — Gordon G Liu
(74) *Attorney, Agent, or Firm* — Price Heneveld LLP; Brian James Brewer

(57) ABSTRACT

A display system is provided for a vehicle equipped with a camera for supplying streamed video images of a scene rearward of the vehicle. The display system includes an image processing unit for receiving the streamed video images and processing the streamed video images, and a display for displaying the processed streamed video images. To perform processing of the streamed video images, the image processing unit is configured to: detect amplitude-modulated light sources in the streamed video images, classify the detected amplitude-modulated light sources into one of several possible classifications, select the streamed video images in which an amplitude-modulated light source is detected that flickers based upon the classification of the amplitude-modulated light source, and modify the selected streamed video images to correct for flicker of any amplitude-modulated light sources in the selected streamed video images.

18 Claims, 4 Drawing Sheets

(51) Int. Cl.
*G06K 9/00* (2006.01)
*H04N 5/235* (2006.01)
*B60R 1/00* (2006.01)

(52) U.S. Cl.
CPC ....... *G06K 9/00825* (2013.01); *H04N 5/2357* (2013.01); *B60R 2300/30* (2013.01); *B60R 2300/8046* (2013.01)

(58) Field of Classification Search
USPC ........................................................ 345/501
See application file for complete search history.

(56) References Cited

U.S. PATENT DOCUMENTS

| | | |
|---|---|---|
| 2,827,594 A | 3/1958 | Rabinow |
| 3,179,845 A | 4/1965 | Kulwiec |
| 3,581,276 A | 5/1971 | Newman |
| 3,663,819 A | 5/1972 | Hicks et al. |
| 4,109,235 A | 8/1978 | Bouthors |
| 4,139,801 A | 2/1979 | Linares |
| 4,151,526 A | 4/1979 | Hinachi et al. |
| 4,214,266 A | 7/1980 | Myers |
| 4,236,099 A | 11/1980 | Rosenblum |
| 4,257,703 A | 3/1981 | Goodrich |
| 4,258,979 A | 3/1981 | Mahin |
| 4,277,804 A | 7/1981 | Robison |
| 4,286,308 A | 8/1981 | Wolff |
| 4,310,851 A | 1/1982 | Pierrat |
| 4,357,558 A | 11/1982 | Massoni et al. |
| 4,376,909 A | 3/1983 | Tagami et al. |
| 4,479,173 A | 10/1984 | Rumpakis |
| 4,499,451 A | 2/1985 | Suzuki et al. |
| 4,599,544 A | 7/1986 | Martin |
| 4,638,287 A | 1/1987 | Umebayashi et al. |
| 4,645,975 A | 2/1987 | Meitzler et al. |
| 4,665,321 A | 5/1987 | Chang et al. |
| 4,665,430 A | 5/1987 | Hiroyasu |
| 4,692,798 A | 9/1987 | Seko et al. |
| 4,716,298 A | 12/1987 | Etoh |
| 4,727,290 A | 2/1988 | Smith et al. |
| 4,740,838 A | 4/1988 | Mase et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,910,591 A | 3/1990 | Petrossian et al. |
| 4,930,742 A | 6/1990 | Schofield et al. |
| 4,934,273 A | 6/1990 | Endriz |
| 4,967,319 A | 10/1990 | Seko |
| 5,005,213 A | 4/1991 | Hanson et al. |
| 5,008,946 A | 4/1991 | Ando |
| 5,027,200 A | 6/1991 | Petrossian et al. |
| 5,036,437 A | 7/1991 | Macks |
| 5,072,154 A | 12/1991 | Chen |
| 5,086,253 A | 2/1992 | Lawler |
| 5,096,287 A | 3/1992 | Kakinami et al. |
| 5,121,200 A | 6/1992 | Choi et al. |
| 5,124,549 A | 6/1992 | Michaels et al. |
| 5,166,681 A | 11/1992 | Bottesch et al. |
| 5,182,502 A | 1/1993 | Slotkowski et al. |
| 5,187,383 A | 2/1993 | Taccetta et al. |
| 5,197,562 A | 3/1993 | Kakinami et al. |
| 5,230,400 A | 7/1993 | Kakainami et al. |
| 5,235,178 A | 8/1993 | Hegyi |
| 5,243,417 A | 9/1993 | Pollard |
| 5,289,321 A | 2/1994 | Secor |
| 5,296,924 A | 3/1994 | Blancard et al. |
| 5,304,980 A | 4/1994 | Maekawa |
| 5,329,206 A | 7/1994 | Slotkowski et al. |
| 5,347,261 A | 9/1994 | Adell |
| 5,347,459 A | 9/1994 | Greenspan et al. |
| 5,355,146 A | 10/1994 | Chiu et al. |
| 5,379,104 A | 1/1995 | Takao |
| 5,386,285 A | 1/1995 | Asayama |
| 5,396,054 A | 3/1995 | Krichever et al. |
| 5,402,170 A | 3/1995 | Parulski et al. |
| 5,408,357 A | 4/1995 | Beukema |
| 5,414,461 A | 5/1995 | Kishi et al. |
| 5,416,318 A | 5/1995 | Hegyi |
| 5,418,610 A | 5/1995 | Fischer |
| 5,424,952 A | 6/1995 | Asayama |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,451,822 A | 9/1995 | Bechtel et al. |
| 5,452,004 A | 9/1995 | Roberts |
| 5,469,298 A | 11/1995 | Suman et al. |
| 5,471,515 A | 11/1995 | Fossum et al. |
| 5,475,441 A | 12/1995 | Parulski et al. |
| 5,475,494 A | 12/1995 | Nishida et al. |
| 5,481,268 A | 1/1996 | Higgins |
| 5,483,346 A | 1/1996 | Butzer |
| 5,483,453 A | 1/1996 | Uemura et al. |
| 5,485,155 A | 1/1996 | Hibino |
| 5,485,378 A | 1/1996 | Franke et al. |
| 5,488,496 A | 1/1996 | Pine |
| 5,508,592 A | 4/1996 | Lapatovich et al. |
| 5,515,448 A | 5/1996 | Nishitani |
| 5,523,811 A | 6/1996 | Wada et al. |
| 5,530,421 A | 6/1996 | Marshall et al. |
| 5,535,144 A | 7/1996 | Kise |
| 5,537,003 A | 7/1996 | Bechtel et al. |
| 5,541,590 A | 7/1996 | Nishio |
| 5,541,724 A | 7/1996 | Hoashi |
| 5,550,677 A | 8/1996 | Schofield et al. |
| 5,554,912 A | 9/1996 | Thayer et al. |
| 5,574,443 A | 11/1996 | Hsieh |
| 5,574,463 A | 11/1996 | Shirai et al. |
| 5,576,975 A | 11/1996 | Sasaki et al. |
| 5,587,929 A | 12/1996 | League et al. |
| 5,592,146 A | 1/1997 | Kover, Jr. et al. |
| 5,602,542 A | 2/1997 | Widmann et al. |
| 5,614,788 A | 3/1997 | Mullins et al. |
| 5,615,023 A | 3/1997 | Yang |
| 5,617,085 A | 4/1997 | Tsutsumi et al. |
| 5,621,460 A | 4/1997 | Hatlestad et al. |
| 5,634,709 A | 6/1997 | Iwama |
| 5,642,238 A | 6/1997 | Sala |
| 5,646,614 A | 7/1997 | Abersfelder et al. |
| 5,650,765 A | 7/1997 | Park |
| 5,660,454 A | 8/1997 | Mori et al. |
| 5,666,028 A | 9/1997 | Bechtel et al. |
| 5,670,935 A | 9/1997 | Schofield et al. |
| 5,680,123 A | 10/1997 | Lee |
| 5,684,473 A | 11/1997 | Hibino et al. |
| 5,707,129 A | 1/1998 | Kobayashi |
| 5,708,410 A | 1/1998 | Blank et al. |
| 5,708,857 A | 1/1998 | Ishibashi |
| 5,710,565 A | 1/1998 | Shirai et al. |
| 5,714,751 A | 2/1998 | Chen |
| 5,715,093 A | 2/1998 | Schierbeek et al. |
| 5,729,194 A | 3/1998 | Spears et al. |
| 5,736,816 A | 4/1998 | Strenke et al. |
| 5,745,050 A | 4/1998 | Nakagawa |
| 5,751,211 A | 5/1998 | Shirai et al. |
| 5,751,832 A | 5/1998 | Panter et al. |
| 5,754,099 A | 5/1998 | Nishimura et al. |
| 5,760,828 A | 6/1998 | Cortes |
| 5,764,139 A | 6/1998 | Nojima et al. |
| 5,767,793 A | 6/1998 | Agravante et al. |
| 5,781,105 A | 7/1998 | Bitar et al. |
| 5,786,787 A | 7/1998 | Eriksson et al. |
| 5,793,308 A | 8/1998 | Rosinski et al. |
| 5,793,420 A | 8/1998 | Schmidt |
| 5,796,094 A | 8/1998 | Schofield et al. |
| 5,798,727 A | 8/1998 | Shirai et al. |
| 5,811,888 A | 9/1998 | Hsieh |
| 5,812,321 A | 9/1998 | Schierbeek et al. |
| 5,837,994 A | 11/1998 | Stam et al. |
| 5,841,126 A | 11/1998 | Fossum et al. |
| 5,844,505 A | 12/1998 | Van Ryzin |
| 5,845,000 A | 12/1998 | Breed et al. |
| 5,850,176 A | 12/1998 | Kinoshita et al. |

(56) References Cited

U.S. PATENT DOCUMENTS

| | | |
|---|---|---|
| 5,867,214 A | 2/1999 | Anderson et al. |
| 5,877,897 A | 3/1999 | Schofield et al. |
| 5,883,739 A | 3/1999 | Ashihara et al. |
| 5,904,729 A | 5/1999 | Ruzicka |
| 5,905,457 A | 5/1999 | Rashid |
| 5,912,534 A | 6/1999 | Benedict |
| 5,923,027 A | 7/1999 | Stam et al. |
| 5,935,613 A | 8/1999 | Benham et al. |
| 5,940,011 A | 8/1999 | Agravante et al. |
| 5,942,853 A | 8/1999 | Piscart |
| 5,949,331 A | 9/1999 | Schofield et al. |
| 5,956,079 A | 9/1999 | Ridgley |
| 5,956,181 A | 9/1999 | Lin |
| 5,959,555 A | 9/1999 | Furuta |
| 5,990,469 A | 11/1999 | Bechtel et al. |
| 6,008,486 A | 12/1999 | Stam et al. |
| 6,009,359 A | 12/1999 | El-Hakim et al. |
| 6,018,308 A | 1/2000 | Shirai |
| 6,025,872 A | 2/2000 | Ozaki et al. |
| 6,046,766 A | 4/2000 | Sakata |
| 6,049,171 A | 4/2000 | Stam et al. |
| 6,060,989 A | 5/2000 | Gehlot |
| 6,061,002 A | 5/2000 | Weber et al. |
| 6,067,111 A | 5/2000 | Hahn et al. |
| 6,072,391 A | 6/2000 | Suzuki et al. |
| 6,078,355 A | 6/2000 | Zengel |
| 6,097,023 A | 8/2000 | Schofield et al. |
| 6,102,546 A | 8/2000 | Carter |
| 6,106,121 A | 8/2000 | Buckley et al. |
| 6,111,498 A | 8/2000 | Jobes et al. |
| 6,115,651 A | 9/2000 | Cruz |
| 6,122,597 A | 9/2000 | Saneyoshi et al. |
| 6,128,576 A | 10/2000 | Nishimoto et al. |
| 6,130,421 A | 10/2000 | Bechtel et al. |
| 6,130,448 A | 10/2000 | Bauer et al. |
| 6,140,933 A | 10/2000 | Bugno et al. |
| 6,144,158 A | 11/2000 | Beam |
| 6,151,065 A | 11/2000 | Steed et al. |
| 6,151,539 A | 11/2000 | Bergholz et al. |
| 6,154,149 A | 11/2000 | Tychkowski et al. |
| 6,157,294 A | 12/2000 | Urai et al. |
| 6,166,629 A | 12/2000 | Andreas |
| 6,166,698 A | 12/2000 | Turnbull et al. |
| 6,167,755 B1 | 1/2001 | Damson et al. |
| 6,172,600 B1 | 1/2001 | Kakinami et al. |
| 6,172,601 B1 | 1/2001 | Wada et al. |
| 6,175,300 B1 | 1/2001 | Kendrick |
| 6,184,781 B1 | 2/2001 | Ramakesavan |
| 6,185,492 B1 | 2/2001 | Kagawa et al. |
| 6,191,704 B1 | 2/2001 | Takenaga et al. |
| 6,200,010 B1 | 3/2001 | Anders |
| 6,218,934 B1 | 4/2001 | Regan |
| 6,222,447 B1 | 4/2001 | Schofield et al. |
| 6,249,214 B1 | 6/2001 | Kashiwazaki |
| 6,250,766 B1 | 6/2001 | Strumolo et al. |
| 6,255,639 B1 | 7/2001 | Stam et al. |
| 6,259,475 B1 | 7/2001 | Ramachandran et al. |
| 6,265,968 B1 | 7/2001 | Betzitza et al. |
| 6,268,803 B1 | 7/2001 | Gunderson et al. |
| 6,269,308 B1 | 7/2001 | Kodaka et al. |
| 6,281,632 B1 | 8/2001 | Stam et al. |
| 6,281,804 B1 | 8/2001 | Haller et al. |
| 6,289,332 B2 | 9/2001 | Menig et al. |
| 6,300,879 B1 | 10/2001 | Regan et al. |
| 6,304,173 B2 | 10/2001 | Pala et al. |
| 6,317,057 B1 | 11/2001 | Lee |
| 6,320,612 B1 | 11/2001 | Young |
| 6,324,295 B1 | 11/2001 | Avonique et al. |
| 6,329,925 B1 | 12/2001 | Skiver et al. |
| 6,330,511 B2 | 12/2001 | Ogura et al. |
| 6,335,680 B1 | 1/2002 | Matsuoka |
| 6,344,805 B1 | 2/2002 | Yasui et al. |
| 6,348,858 B2 | 2/2002 | Weis et al. |
| 6,349,782 B2 | 2/2002 | Sekiya et al. |
| 6,356,206 B1 | 3/2002 | Takenaga et al. |
| 6,356,376 B1 | 3/2002 | Tonar et al. |
| 6,357,883 B1 | 3/2002 | Strumolo et al. |
| 6,363,326 B1 | 3/2002 | Scully |
| 6,369,701 B1 | 4/2002 | Yoshida et al. |
| 6,379,013 B1 | 4/2002 | Bechtel et al. |
| 6,396,040 B1 | 5/2002 | Hill |
| 6,396,397 B1 | 5/2002 | Bos et al. |
| 6,403,942 B1 | 6/2002 | Stam |
| 6,408,247 B1 | 6/2002 | Ichikawa et al. |
| 6,412,959 B1 | 7/2002 | Tseng |
| 6,415,230 B1 | 7/2002 | Maruko et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,428,172 B1 | 8/2002 | Hutzel et al. |
| 6,433,680 B1 | 8/2002 | Ho |
| 6,437,688 B1 | 8/2002 | Kobayashi |
| 6,438,491 B1 | 8/2002 | Farmer |
| 6,441,872 B1 | 8/2002 | Ho |
| 6,442,465 B2 | 8/2002 | Breed et al. |
| 6,443,602 B1 | 9/2002 | Tanabe et al. |
| 6,447,128 B1 | 9/2002 | Lang et al. |
| 6,452,533 B1 | 9/2002 | Yamabuchi et al. |
| 6,463,369 B2 | 10/2002 | Sadano et al. |
| 6,465,962 B1 | 10/2002 | Fu et al. |
| 6,466,701 B1 | 10/2002 | Ejiri et al. |
| 6,469,739 B1 | 10/2002 | Bechtel et al. |
| 6,472,977 B1 | 10/2002 | Pochmuller |
| 6,473,001 B1 | 10/2002 | Blum |
| 6,476,731 B1 | 11/2002 | Miki et al. |
| 6,476,855 B1 | 11/2002 | Yamamoto |
| 6,483,429 B1 | 11/2002 | Yasui et al. |
| 6,483,438 B2 | 11/2002 | DeLine et al. |
| 6,487,500 B2 | 11/2002 | Lemelson et al. |
| 6,491,416 B1 | 12/2002 | Strazzanti |
| 6,498,620 B2 | 12/2002 | Schofield et al. |
| 6,501,387 B2 | 12/2002 | Skiver et al. |
| 6,507,779 B2 | 1/2003 | Breed et al. |
| 6,515,581 B1 | 2/2003 | Ho |
| 6,515,597 B1 | 2/2003 | Wada et al. |
| 6,520,667 B1 | 2/2003 | Mousseau |
| 6,522,969 B2 | 2/2003 | Kannonji |
| 6,542,085 B1 | 4/2003 | Yang |
| 6,542,182 B1 | 4/2003 | Chutorash |
| 6,545,598 B1 | 4/2003 | De Villeroche |
| 6,550,943 B2 | 4/2003 | Strazzanti |
| 6,553,130 B1 | 4/2003 | Lemelson et al. |
| 6,558,026 B2 | 5/2003 | Strazzanti |
| 6,559,761 B1 | 5/2003 | Miller et al. |
| 6,572,233 B1 | 6/2003 | Northman et al. |
| 6,580,373 B1 | 6/2003 | Ohashi |
| 6,581,007 B2 | 6/2003 | Hasegawa et al. |
| 6,583,730 B2 | 6/2003 | Lang et al. |
| 6,575,643 B2 | 7/2003 | Takahashi |
| 6,587,573 B1 | 7/2003 | Stam et al. |
| 6,591,192 B2 | 7/2003 | Okamura et al. |
| 6,594,583 B2 | 7/2003 | Ogura et al. |
| 6,594,614 B2 | 7/2003 | Studt et al. |
| 6,611,202 B2 | 8/2003 | Schofield et al. |
| 6,611,227 B1 | 8/2003 | Nebiyeloul-Kifle |
| 6,611,610 B1 | 8/2003 | Stam et al. |
| 6,611,759 B2 | 8/2003 | Brosche |
| 6,614,387 B1 | 9/2003 | Deadman |
| 6,616,764 B2 | 9/2003 | Kramer et al. |
| 6,617,564 B2 | 9/2003 | Ockerse et al. |
| 6,618,672 B2 | 9/2003 | Sasaki et al. |
| 6,630,888 B2 | 10/2003 | Lang et al. |
| 6,631,316 B2 | 10/2003 | Stam et al. |
| 6,636,258 B2 | 10/2003 | Strumolo |
| 6,642,840 B2 | 11/2003 | Lang et al. |
| 6,642,851 B2 | 11/2003 | Deline et al. |
| 6,648,477 B2 | 11/2003 | Hutzel et al. |
| 6,665,592 B2 | 12/2003 | Kodama |
| 6,670,207 B1 | 12/2003 | Roberts |
| 6,670,910 B2 | 12/2003 | Delcheccolo et al. |
| 6,674,370 B2 | 1/2004 | Rodewald et al. |
| 6,675,075 B1 | 1/2004 | Engelsberg et al. |
| 6,677,986 B1 | 1/2004 | Pöchmüller |

(56) References Cited

U.S. PATENT DOCUMENTS

| | | |
|---|---|---|
| 6,683,539 B2 | 1/2004 | Trajkovic et al. |
| 6,683,969 B1 | 1/2004 | Nishigaki et al. |
| 6,690,268 B2 | 2/2004 | Schofield et al. |
| 6,690,413 B1 | 2/2004 | Moore |
| 6,693,517 B2 | 2/2004 | Mccarty et al. |
| 6,693,518 B2 | 2/2004 | Kumata |
| 6,693,519 B2 | 2/2004 | Keirstead |
| 6,693,524 B1 | 2/2004 | Payne |
| 6,717,610 B1 | 4/2004 | Bos et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,737,964 B2 | 5/2004 | Samman et al. |
| 6,738,088 B1 | 5/2004 | Uskolovsky et al. |
| 6,744,353 B2 | 6/2004 | Sjonell |
| 6,772,057 B2 | 8/2004 | Breed et al. |
| 6,774,988 B2 | 8/2004 | Stam et al. |
| 6,846,098 B2 | 1/2005 | Bourdelais et al. |
| 6,847,487 B2 | 1/2005 | Burgner |
| 6,861,809 B2 | 3/2005 | Stam |
| 6,902,307 B2 | 6/2005 | Strazzanti |
| 6,912,001 B2 | 6/2005 | Okamoto et al. |
| 6,913,375 B2 | 7/2005 | Strazzanti |
| 6,923,080 B1 | 8/2005 | Dobler et al. |
| 6,930,737 B2 | 8/2005 | Weindorf et al. |
| 6,946,978 B2 | 9/2005 | Schofield |
| 7,012,543 B2 | 3/2006 | Deline et al. |
| 7,038,577 B2 | 5/2006 | Pawlicki et al. |
| 7,046,448 B2 | 5/2006 | Burgner |
| 7,175,291 B1 | 2/2007 | Li |
| 7,255,465 B2 | 8/2007 | Deline et al. |
| 7,262,406 B2 | 8/2007 | Heslin et al. |
| 7,265,342 B2 | 9/2007 | Heslin et al. |
| 7,292,208 B1 | 11/2007 | Park et al. |
| 7,311,428 B2 | 12/2007 | Deline et al. |
| 7,321,112 B2 | 1/2008 | Stam et al. |
| 7,360,932 B2 | 4/2008 | Uken et al. |
| 7,417,221 B2 | 8/2008 | Creswick et al. |
| 7,446,650 B2 | 11/2008 | Scholfield et al. |
| 7,467,883 B2 | 12/2008 | Deline et al. |
| 7,468,651 B2 | 12/2008 | Deline et al. |
| 7,505,047 B2 | 3/2009 | Yoshimura |
| 7,533,998 B2 | 5/2009 | Schofield et al. |
| 7,548,291 B2 | 6/2009 | Lee et al. |
| 7,565,006 B2 | 7/2009 | Stam et al. |
| 7,567,291 B2 | 7/2009 | Bechtel et al. |
| 7,579,940 B2 | 8/2009 | Schofield et al. |
| 7,653,215 B2 | 1/2010 | Stam |
| 7,658,521 B2 | 2/2010 | Deline et al. |
| 7,711,479 B2 | 5/2010 | Taylor et al. |
| 7,719,408 B2 | 5/2010 | Deward et al. |
| 7,720,580 B2 | 5/2010 | Higgins-Luthman |
| 7,815,326 B2 | 10/2010 | Blank et al. |
| 7,877,175 B2 | 1/2011 | Higgins-Luthman |
| 7,881,839 B2 | 2/2011 | Stam et al. |
| 7,888,629 B2 | 2/2011 | Heslin et al. |
| 7,914,188 B2 | 3/2011 | Deline et al. |
| 7,972,045 B2 | 7/2011 | Schofield |
| 7,994,471 B2 | 8/2011 | Heslin et al. |
| 8,031,225 B2 | 10/2011 | Watanabe et al. |
| 8,045,760 B2 | 10/2011 | Stam et al. |
| 8,059,235 B2 | 11/2011 | Utsumi et al. |
| 8,063,753 B2 | 11/2011 | Deline et al. |
| 8,090,153 B2 | 1/2012 | Schofield et al. |
| 8,100,568 B2 | 1/2012 | Deline et al. |
| 8,116,929 B2 | 2/2012 | Higgins-Luthman |
| 8,120,652 B2 | 2/2012 | Bechtel et al. |
| 8,142,059 B2 | 3/2012 | Higgins-Luthman et al. |
| 8,162,518 B2 | 4/2012 | Schofield |
| 8,201,800 B2 | 6/2012 | Filipiak |
| 8,203,433 B2 | 6/2012 | Deuber et al. |
| 8,217,830 B2 | 7/2012 | Lynam |
| 8,222,588 B2 | 7/2012 | Schofield et al. |
| 8,237,909 B2 | 8/2012 | Ostreko et al. |
| 8,258,433 B2 | 9/2012 | Byers et al. |
| 8,325,028 B2 | 12/2012 | Schofield et al. |
| 8,482,683 B2 | 7/2013 | Hwang et al. |
| 2001/0019356 A1 | 9/2001 | Takeda et al. |
| 2001/0022616 A1 | 9/2001 | Rademacher et al. |
| 2001/0026316 A1 | 10/2001 | Senatore |
| 2001/0045981 A1 | 11/2001 | Gloger et al. |
| 2002/0040962 A1 | 4/2002 | Schofield et al. |
| 2002/0044065 A1 | 4/2002 | Quist et al. |
| 2002/0105423 A1* | 8/2002 | Rast .................. B60Q 1/44 340/479 |
| 2002/0191127 A1 | 12/2002 | Roberts et al. |
| 2003/0002165 A1 | 1/2003 | Mathias et al. |
| 2003/0007261 A1 | 1/2003 | Hutzel et al. |
| 2003/0016125 A1 | 1/2003 | Lang et al. |
| 2003/0016287 A1 | 1/2003 | Nakayama et al. |
| 2003/0025596 A1 | 2/2003 | Lang et al. |
| 2003/0025597 A1 | 2/2003 | Schofield |
| 2003/0030546 A1 | 2/2003 | Tseng |
| 2003/0030551 A1 | 2/2003 | Ho |
| 2003/0030724 A1 | 2/2003 | Okamoto |
| 2003/0035050 A1 | 2/2003 | Mizusawa |
| 2003/0043269 A1 | 3/2003 | Park |
| 2003/0052969 A1 | 3/2003 | Satoh et al. |
| 2003/0058338 A1 | 3/2003 | Kawauchi et al. |
| 2003/0067383 A1 | 4/2003 | Yang |
| 2003/0076415 A1 | 4/2003 | Strumolo |
| 2003/0080877 A1 | 5/2003 | Takagi et al. |
| 2003/0085806 A1 | 5/2003 | Samman et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0098908 A1 | 5/2003 | Misaiji et al. |
| 2003/0103141 A1 | 6/2003 | Bechtel et al. |
| 2003/0103142 A1 | 6/2003 | Hitomi et al. |
| 2003/0117522 A1 | 6/2003 | Okada |
| 2003/0122929 A1 | 7/2003 | Minaudo et al. |
| 2003/0122930 A1 | 7/2003 | Schofield et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0202357 A1 | 10/2003 | Strazzanti |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 1/2004 | Lin |
| 2004/0032321 A1 | 2/2004 | McMahon et al. |
| 2004/0036768 A1 | 2/2004 | Green |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0080404 A1 | 4/2004 | White |
| 2004/0080431 A1 | 4/2004 | White |
| 2004/0085196 A1 | 5/2004 | Milelr et al. |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0119668 A1 | 6/2004 | Homma et al. |
| 2004/0125905 A1 | 7/2004 | Vlasenko et al. |
| 2004/0202001 A1 | 10/2004 | Roberts et al. |
| 2005/0140855 A1 | 6/2005 | Utsumi |
| 2005/0237440 A1 | 10/2005 | Sugimura et al. |

(56) References Cited

U.S. PATENT DOCUMENTS

| | | |
|---|---|---|
| 2006/0007550 A1 | 1/2006 | Tonar et al. |
| 2006/0054783 A1* | 3/2006 | Voronov ............... H04N 5/235 250/208.1 |
| 2006/0115759 A1 | 6/2006 | Kim et al. |
| 2006/0139953 A1 | 6/2006 | Chou et al. |
| 2006/0158899 A1 | 7/2006 | Ayabe et al. |
| 2007/0171037 A1 | 7/2007 | Schofield et al. |
| 2007/0221822 A1* | 9/2007 | Stein ...................... B60Q 1/143 250/205 |
| 2008/0068520 A1 | 3/2008 | Minikey, Jr. et al. |
| 2008/0192132 A1 | 8/2008 | Bechtel et al. |
| 2008/0247192 A1 | 10/2008 | Hoshi et al. |
| 2008/0294315 A1 | 11/2008 | Breed |
| 2009/0015736 A1 | 1/2009 | Weller et al. |
| 2009/0141516 A1 | 6/2009 | Wu et al. |
| 2010/0201896 A1 | 8/2010 | Ostreko et al. |
| 2013/0028473 A1 | 1/2013 | Hilldore et al. |
| 2013/0229521 A1 | 9/2013 | Siecke et al. |
| 2014/0347488 A1 | 11/2014 | Tazaki et al. |

FOREIGN PATENT DOCUMENTS

| | | | |
|---|---|---|---|
| EP | 2391117 A2 | | 11/2011 |
| GB | 2338363 | | 12/1999 |
| JP | 1178693 | | 3/1999 |
| JP | 2005148119 | | 6/2005 |
| JP | 2005327600 | | 11/2005 |
| JP | 2008139819 A | | 6/2008 |
| JP | 2008211442 | | 9/2008 |
| JP | 20093866 A | | 2/2009 |
| JP | 2009214795 A | * | 9/2009 |
| JP | 2013216286 | | 10/2013 |
| WO | 9621581 | | 7/1996 |
| WO | 2007103573 A2 | | 9/2007 |
| WO | 2010090964 A1 | | 8/2010 |

OTHER PUBLICATIONS

Adler, "A New Automotive AMLCD Module," Proceedings of the Vehicle Display Symposium, Nov. 2, 1995, pp. 67-71, Society for Information Display, Detroit Chapter, Santa Ana, CA.

Sayer, et al., "In-Vehicle Displays for Crash Avoidance and Navigation Systems,"Proceedings of the Vehicle Display Symposium, Sep. 18, 1996, pp. 39-42, Society for Information Display, Detroit Chapter, Santa Ana, CA.

Knoll, et al., "Application of Graphic Displays in Automobiles," SID 87 Digest, 1987, pp. 41-44, 5A.2.

Terada, et al., "Development of Central Information Display of Automotive Application," SID 89 Digest, 1989, pp. 192-195, Society for Information Display, Detroit Center, Santa Ana, CA.

Thomsen, et al., "AMLCD Design Considerations for Avionics and Vetronics Applications," Proceedings of the 5th Annual Flat Panel Display Strategic and Technical Symposium, Sep. 9-10, 1998, pp. 139-145, Society for Information Display, Metropolitan Detroit Chapter, CA.

Knoll, et al., "Conception of an Integrated Driver Information System," SID International Symposium Digest of Technical Papers, 1990, pp. 126-129, Society for Information Display, Detroit Center, Santa Ana, CA.

Vincen, "An Analysis of Direct-View FPDs for Automotive Multi-Media Applications,"Proceedings of the 6th Annual Strategic and Technical Symposium "Vehicular Applications of Displays and Microsensors," Sep. 22-23, 1999, pp. 39-46, Society for Information Display, Metropolitan Detroit Chapter, San Jose, CA.

Zuk, et al., "Flat Panel Display Applications in Agriculture Equipment," Proceedings of the 5th Annual Flat Panel Display Strategic and Technical Symposium, Sep. 9-10, 1998, pp. 125-130, Society for Information Display, Metropolitan Detroit Chapter, CA.

Vijan, et al., "A 1.7-Mpixel Full-Color Diode Driven AM-LCD," SID International Symposium, 1990, pp. 530-533, Society for Information Display, Playa del Rey, CA.

Vincen, "The Automotive Challenge to Active Matrix LCD Technology," Proceedings of the Vehicle Display Symposium, 1996, pp. 17-21, Society for Information Display, Detroit Center, Santa Ana, CA.

Corsi, et al., "Reconfigurable Displays Used as Primary Automotive Instrumentation," SAE Technical Paper Series, 1989, pp. 13-18, Society of Automotive Engineers, Inc., Warrendale, PA.

Schumacher, "Automotive Display Trends," SID 96 Digest, 1997, pp. 1-6, Delco Electronics Corp., Kokomo, IN.

Knoll, "The Use of Displays in Automotive Applications," Journal of the SID 5/3 1997, pp. 165-172, 315-316, Stuttgart, Germany.

Donofrio, "Looking Beyond the Dashboard," SID 2002, pp. 30-34, Ann Arbor, MI.

Stone, "Automotive Display Specification," Proceedings of the Vehicle Display Symposium, 1995, pp. 93-96, Society or Information Display, Detroit Center, Santa Ana, CA.

\* cited by examiner ents of the vehicle rearview

SYSTEM AND METHOD FOR PROCESSING STREAMED VIDEO IMAGES TO CORRECT FOR FLICKER OF AMPLITUDE-MODULATED LIGHTS

CROSS-REFERENCE TO RELATED APPLICATION

This application claims priority under 35 U.S.C. § 119(e) upon U.S. Provisional Patent Application No. 62/182,863, entitled "SYSTEM AND METHOD FOR PROCESSING STREAMED VIDEO IMAGES TO CORRECT FOR FLICKER OF AMPLITUDE-MODULATED LIGHTS" filed on Jun. 22, 2015, by Gregory S. Bush et al., the entire disclosure of which is incorporated herein by reference.

BACKGROUND OF THE INVENTION

The present invention generally relates to processing of video images streamed to a display, and more specifically to processing of streamed video images of scenes exterior to a vehicle. In some embodiments the present invention pertains even more specifically to processing of video images obtained from a rearward facing camera in a vehicle that are streamed to a display serving as a replacement for a rearview mirror.

SUMMARY OF THE INVENTION

According to one aspect of the invention, a display system is provided for a vehicle equipped with a camera for supplying streamed video images of a scene rearward of the vehicle. The display system comprises: an image processing unit for receiving the streamed video images and processing the streamed video images; and a display for displaying the processed streamed video images. To perform processing of the streamed video images, the image processing unit is configured to: detect amplitude-modulated light sources in the streamed video images, classify the detected amplitude-modulated light sources into one of several possible classifications, select the streamed video images in which an amplitude-modulated light source is detected that flickers based upon the classification of the amplitude-modulated light source, and modify the selected streamed video images to correct for flicker of any amplitude-modulated light sources in the selected streamed video images.

According to one aspect of the invention, a display system is provided that comprises: an image processing unit for receiving streamed video images and processing the streamed video images; and a display for displaying the processed streamed video images. To perform processing of the streamed video images, the image processing unit is configured to: detect amplitude-modulated light sources in the streamed video images, classify the detected amplitude-modulated light sources into at least two classes where a first class of detected amplitude-modulated light sources have a flicker not perceivable by a human when viewed directly by the human, and a second class of detected amplitude-modulated light sources have a flicker that is perceivable by a human when viewed directly by the human, track the detected amplitude-modulated light sources through image frames of the streamed video images, and modify the streamed video images in which an amplitude-modulated light source is detected that is classified in the first class by substituting pixels representing each of the detected amplitude-modulated light sources that is classified in the first class such that the pixels representing the detected amplitude-modulated light source are always at a state so that when the processed streamed video images are displayed, each of the detected amplitude-modulated light sources that is classified in the first class appears to have no perceivable flicker.

According to one aspect of the invention, a method of processing streamed video images is provided that comprises: detecting amplitude-modulated light sources in the streamed video images; classifying the detected amplitude-modulated light sources into at least two classes where a first class of detected amplitude-modulated light sources have a flicker not perceivable by a human when viewed directly by the human, and a second class of detected amplitude-modulated light sources have a flicker that is perceivable by a human when viewed directly by the human; tracking the detected amplitude-modulated light sources through image frames of the streamed video images; and modifying the streamed video images in which an amplitude-modulated light source is detected that is classified in the first class by substituting pixels representing each of the detected amplitude-modulated light sources that is classified in the first class such that the pixels representing the detected amplitude-modulated light source are always at a state so that when the processed streamed video images are displayed, each of the detected amplitude-modulated light sources that is classified in the first class appears to have no perceivable flicker.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
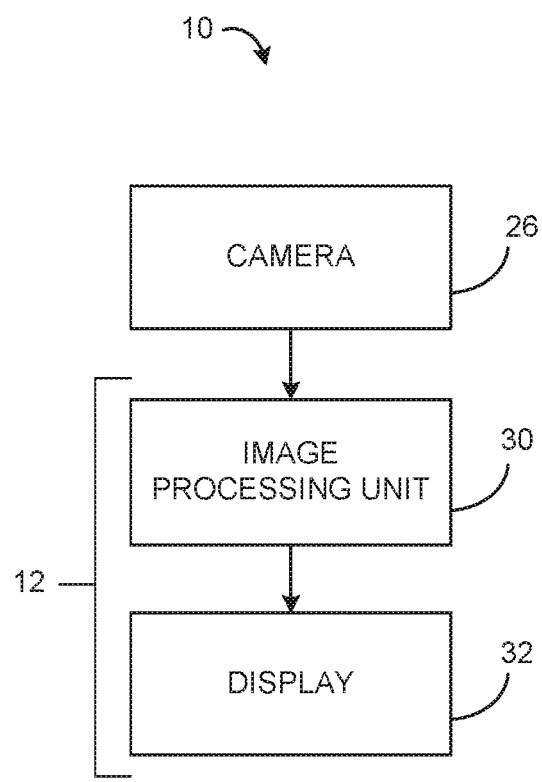
FIG. 1 is a block diagram of an imaging system according to an embodiment of the invention.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

A common problem in rendering streaming video data captured from an imager occurs when the object being imaged is an amplitude modulated (AM) light source. A very common example of this type of light source is one which is pulsing on/off at some periodic rate, like a vehicle lamp assembly constructed with light emitting diodes (LEDs), where the LEDs are pulse-width-modulated (PWM), which is a subset of possible amplitude modulation methods. The PWM period and duty cycle result in the LEDs being turned on and off at some periodic rate, and a camera taking streaming images of this lamp assembly will capture successive images where an LED may be 'on' in one or more consecutive images, and then 'off' in one or more subsequent images. Other examples of AM light sources include the flashers on an emergency vehicle (which may also be comprised of PWM LEDs), a turn signal on a vehicle, or a fluorescent light source in a tunnel or parking garage.

For many of the exemplary AM light sources listed above, a human observer of the light source does not perceive any flicker in the 'on/off' pattern since the frequency of the on/off pattern is higher than the human vision system can perceive (PWM LED headlamp/tail lamp assemblies being a prime example). But in imaging the AM light element with an electronic camera system, the exposure time, frame rate, and shutter scheme (rolling or global) used when capturing the light element at a particular pixel in the imager array may result in some images showing this pixel to be imaging an 'on' state of the light element, and successive images showing this pixel capturing the 'off' state of the light element. In attempting to render these images to a display, at some display frame rate, the display system may end up presenting the human observer an 'on/off' pattern that is discernible as a 'flickering' light.

FIG. 1 shows an image system 10 according to a first embodiment. As shown, image system 10 includes a camera 26 that captures images of a scene and outputs streamed video images of the scene, and a display system 12, which includes an image processing unit 30 that receives the streamed video images and processes the images (as discussed in detail below) and outputs the processed streamed video images, and a display 32 that displays the processed streamed video images.

Figure 2:
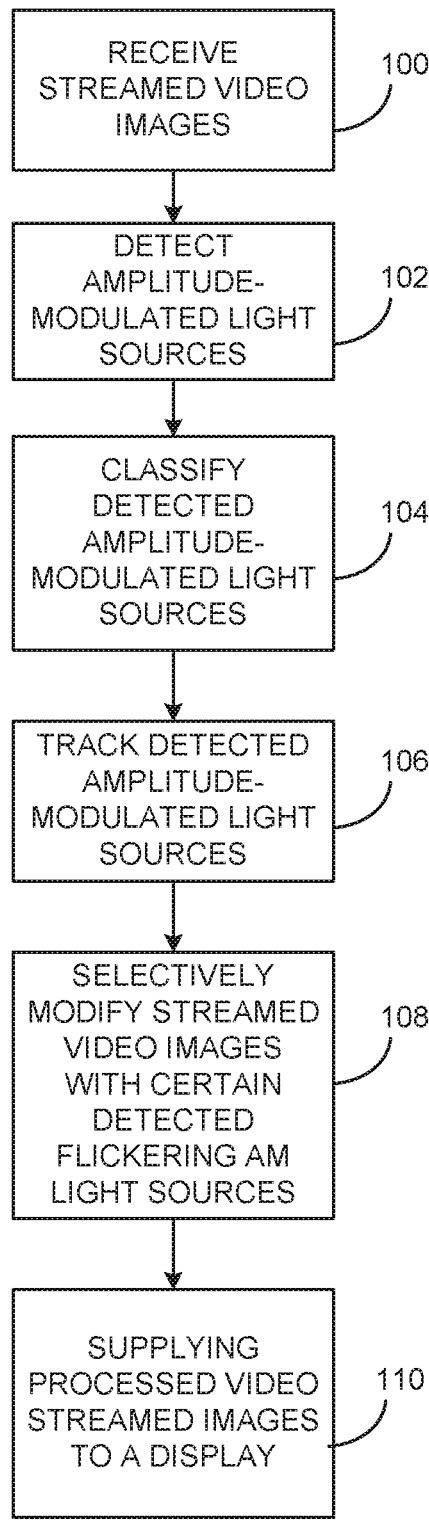
FIG. 2 is a flow chart showing the method steps performed by the image processing unit shown in FIG. 1.

The methods and processing sequences described herein are intended to mitigate the 'flickering' phenomena seen in rendered AM headlamps and tail lamps (especially targeted to PWM LED assemblies, but not limited to lighting of that technology). As described below, the platform on which these methods may be implemented is part of an automotive mirror replacement system, where a vehicle mirror is replaced by camera (lens plus digital imager) 26, image processing unit (serial processor and/or ASIC/FPGA) 30, and electronic display (LCD/LED panel) 32. The methods described herein may be incorporated in the image processing unit 30 in the above system 10. As shown in FIG. 2, the method steps may be performed in the following sequence (as would occur on the image processing unit 30): 1) receiving the streamed video images (step 100); 2) detection of the PWM LED (or AM) lights in a succession of the streamed video images (step 102); 3) differentiation/classification of the PWM LED (or AM) elements (which are part of a headlamp or tail lamp assembly) from other illuminating objects in the scene which have time-varying brightness levels (e.g. emergency vehicle lights) (step 104); 4) tracking of the pulsed lights over time (step 106); 5) correction of the flicker artifact associated with these rendered lights in a way that is appropriate to the specific type of light source (step 108); and 6) supplying the processed video streamed images to display 32 (step 110). Possible techniques for each of these steps are detailed below.

Multiple methods exist for performing step 102 involving detection of time-varying lights in a sequence of captured images. In the problem area of a rearview mirror replacement system (based on an electronic camera 26, an image processing unit 30, and a display system 32), PWM LED lights that may need to be detected are those originating from vehicle headlamp and tail lamp systems. These lights are related to vehicles, which are on the same roadway as the vehicle outfitted with the mirror replacement system. The search space for the PWM LED lights of interest thus can be influenced by roadway detection, where an auto-aim or lane detection system can narrow the light search space to the vertical region above the detected road boundaries (from a lane detection system), or around the focus of expansion (from an auto aim system), and discriminated from stationary non-vehicle light sources. In this reduced search space, methods exist in existing high beam control systems to detect PWM LED lights as disclosed in commonly-owned U.S. Pat. Nos. 6,587,573; 6,593,698; 6,611,610; 6,631,316; 6,653,614; 6,728,393; 6,774,988; 6,861,809; 6,906,467; 6,947,577; 7,321,112; 7,417,221; 7,565,006; 7,567,291; 7,653,215; 7,683,326; 7,881,839; 8,045,760; 8,120,652; and 8,543,254, the entire disclosures of which are incorporated herein by reference.

Additionally, detection methods such as frame subtraction may be used for detecting time-varying light sources, where successive images are subtracted from one another to produce temporal difference maps. The resultant maps are then processed by routines (implemented in software or in ASIC/FPGA fabric), which perform some combination of thresholding and/or filtering to identify spatial areas in the map where there were significant changes in pixel brightness between the two source images. The absolute value of the difference data indicates the magnitude of the change in pixel intensity between frames, and the sign of the difference data indicates whether the change in a pixel value between frames is associated with a light source brightening or darkening. The frame data used to generate these temporal difference maps may be raw data from a Bayer patterned image, luminance data extracted from the image, or some other image form extracted from the image processing path. On a typical roadway scene, the most significant deltas in pixel values between a pair of frames (referenced to a single pixel location), tend to be related to these PWM LED (AM) lights which are going from extremely bright to fully off. Motion artifacts can also contribute to temporal changes in image values at the pixel locations, but in the search space of the roadway imaged by the vehicle, this motion is quite small—as the image capture rate is rapid compared to vehicle dynamics, and the brightness changes related to objects which do not produce their own illumination is also quite reduced (imaging a vehicle body at a pixel in the first frame to a part of the vehicle bumper in the next frame does not produce as significant a luminance change than the PWM LED is exhibiting in its on/off sequencing).

Other methods of detecting the presence of AM lights may be leveraged from the imager implementation, where some imagers may supply information (to the pixel level) on whether the scene brightness changed state during the pixel exposure time (especially for an imager such as an HDR CMOS imager).

As described below, the methods for correctly rendering pulsed lights tend to fall in the category of adding image content to 'brighten' the pulsed light location for durations when the light is captured as 'off' and addressing incorrect color measurements induced by the time-varying nature of the lights. The classification operation (step 104) is applied to discriminate between the types of time-varying light sources that introduce the brightness and/or color errors. To ensure only the desired pulsed lights are corrected (and not, for example, motion artifacts), light source classification may be performed to influence the correction step 108. Methods of classifying PWM LED lights are known in high beam control systems such as those disclosed in commonly-owned U.S. Pat. Nos. 6,587,573; 6,593,698; 6,611,610; 6,631,316; 6,653,614; 6,728,393; 6,774,988; 6,861,809; 6,906,467; 6,947,577; 7,321,112; 7,417,221; 7,565,006; 7,567,291; 7,653,215; 7,683,326; 7,881,839; 8,045,760; 8,120,652; and 8,543,254, the entire disclosures of which are incorporated herein by reference. However, other options exist in the use of temporal changes, color, brightness and location. The options for use of brightness and color for classification are greatly enhanced by the use of a Bayer patterned, High Dynamic Range (HDR) imager in the camera system, since bright objects are not saturated with an HDR imager, and the Bayer pattern contributions can be demosaiced to determine color of very bright lights. Object detection systems that classify vehicles can also be used to influence the classification of PWM LED headlamps/tail lamps, by limiting search windows to areas associated with the identified vehicles.

Basically, the classification can be used to distinguish between those flickering lights that are humanly perceivable when viewing the lights directly from those lights that are not humanly perceivable as flickering when viewing the lights directly. This way, the images of the light sources may be selectively modified based upon such classification so that the light sources will appear in the displayed scenes as they would otherwise appear to a human viewing the lights directly.

The step of temporal tracking of pulsed lights (step 106) can be performed using the techniques for tracking vehicle lights as described in known high beam control systems such as those disclosed in commonly-owned U.S. Pat. Nos. 6,587,573; 6,593,698; 6,611,610; 6,631,316; 6,653,614; 6,728,393; 6,774,988; 6,861,809; 6,906,467; 6,947,577; 7,321,112; 7,417,221; 7,565,006; 7,567,291; 7,653,215; 7,683,326; 7,881,839; 8,045,760; 8,120,652; 8,543,254; and 9,185,363, the entire disclosures of which are incorporated herein by reference. This temporal and spatial tracking is useful when selectively modifying the images in order to brighten pixels corresponding to the expected location of the flickering light source in those modified images.

Step 108 involves resolving light flicker for rendering on display 32. With the AM (or pulsed) lights which need to be addressed for display flicker reduction identified, the method of flicker reduction can be performed by substituting low pixel values (from 'off' situations), with values which correspond to levels associated with 'on' situations. The pixel value replacements can be performed at the raw level (a Bayer pattern color associated with the replaced pixel), or at a later processing step in the processing subsystem. There are advantages to performing pixel replacement at the post-demosaic step, and color can be preserved for the PWM light by creating the correct balance of red, green and blue contributions. To maintain the displayed boundaries of AM light objects when pixel substitution is being performed, some image processing steps may be used to predict the object outline in an upcoming frame by using the tracking information of step 106, and an object shape detection routine.

Alternatively, the temporal difference maps from the detection step can be used to define the region of pixels to be substituted (since they represent the pixels which have changed state between frames), with better results possible from using maps that incorporate more than just a two frame difference. One possible implementation of this method would involve creating difference maps of pixel values (by location) across sequences of frames, replacing pixel values that have been determined to be producing images of pulsed PWM LED lights with an average of the highest M values in an N frame sequence (M less than N), if the average of highest M values exceeds some threshold. If analysis of overall image luminance and object color is used, this replacement method may also be used to replace PWM LED detection, classification, tracking and replacement.

A forward-facing turn signal is one example of a time-varying light source that could be detected, classified, and corrected using the ideas disclosed here. Unlike a PWM light, whose row-to-row values on the imager may vary greatly due to beat frequencies, a turn signal's frequency is significantly lower than a camera's frame rate (1-2 Hz as opposed to 15-120 Hz). This results in areas of the light turning on and off at the turn signal's frequency. This spatial consistency within the boundaries of the light, coupled with a detected frequency that is indicative of a turn signal and a yellowish hue, could allow classification of a light as a turn signal as it is tracked. Once the system knows what kind of light it is, the system can fix it by increasing its yellow saturation. This creates more visual appeal, but leaves the on/off behavior of the light alone.

A PWM LED tail lamp is a difficult object to image and visualize correctly because it is typically not relatively bright compared to the background. In addition, for rolling shutter cameras, each row of pixels may have a sharply different level of brightness, and this can be exacerbated by the spatial effects of the Bayer filter, leading to many artifacts in both chrominance and luminance. However, some of these characteristics such as row-to-row variation, local colors that are wildly different, and colors and intensities that change drastically from frame to frame, etc., in addition to other characteristics such as location in the image, predominance of brighter red pixels, motion toward the focus of expansion, frequency estimation on the light modulation, etc., could allow classification of these lights with high accuracy. Fixing PWM LED tail lamps could be performed by making the colors a uniformly saturated red while choosing a luminance from the detected range, which would end up being visually appealing and remove harsh artifacts.

Figure 3:
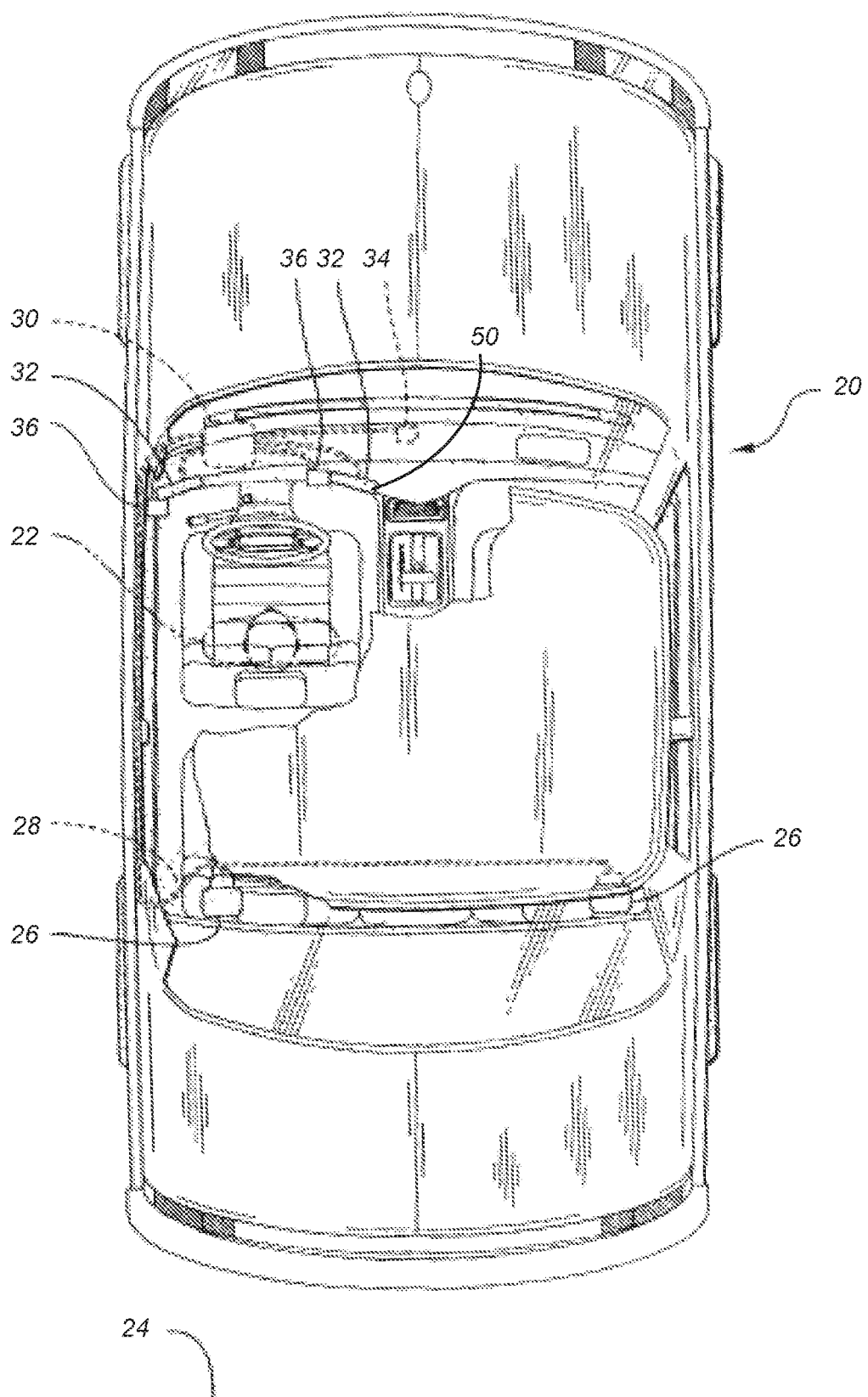
FIG. 3 is a cut-away plan view of a vehicle in which the imaging system may be implemented.

Referring now to FIG. 3, a schematic diagram of a vehicular implementation of the above embodiment is shown. A vehicle 20 is shown that is driven by operator 22. One or more cameras 26 are operative to view a scene 24. In the example shown, scene 24 is generally behind vehicle 20. However, camera 26 may be oriented in a variety of ways to view scenes at other locations about vehicle 20 including, but not limited to, the sides, back, front, bottom, top, and inside. In the example shown, signals representative of the scene are sent via channel 28 to an image processing unit 30. Image processing unit 30 produces an enhanced image of scene 24 on one or more displays 32. Input from an optional ambient light sensor 34 and one or more direct glare sensors 36 is also available to image processing unit 30.

In a particularly useful embodiment, a rearview assembly 50 (FIGS. 4A and 4B) is augmented or replaced by imaging system 10 having cameras 26 which cover a wide field of view to the back and sides so that pedestrians or other objects directly in back of vehicle 20 may be seen and so that oncoming traffic from the sides may be seen. The system is designed so that, when backing out of a parking spot, oncoming vehicles may be seen before backing into the lane of travel. This requires camera system 26 with a near 180° field of view or several camera systems 26 mounted near the rear of the vehicle. An analogous system with a camera or cameras 26 mounted near the front of the vehicle 20 is adapted to view cross traffic at a "blind" intersection before entering the lane of travel of the cross traffic. These are desirable applications for the present invention which supplement the viewing function of conventional rearview mirrors.

Figure 4A:
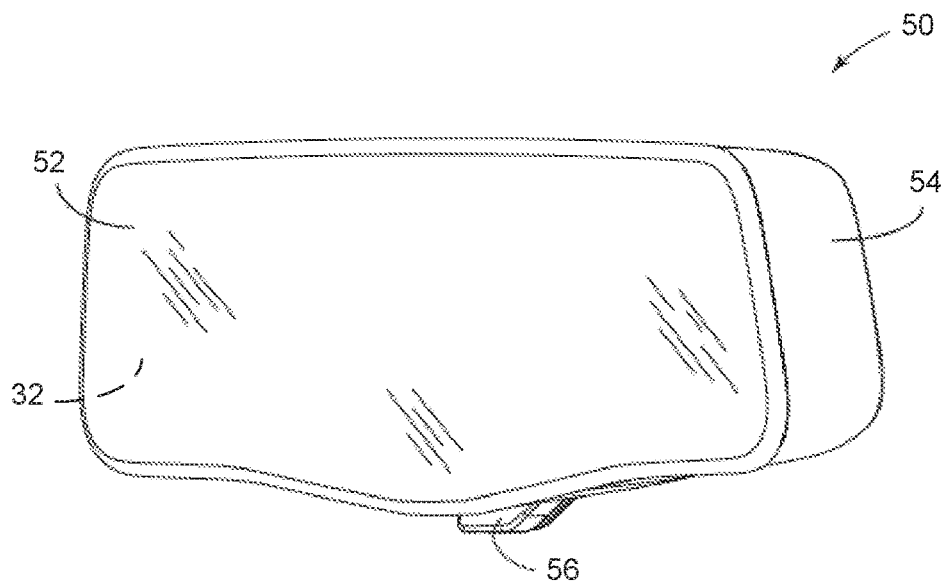
FIG. 4A is a front and side perspective view of a vehicle rearview assembly in which various components of the imaging system may be implemented.
Figure 4B:
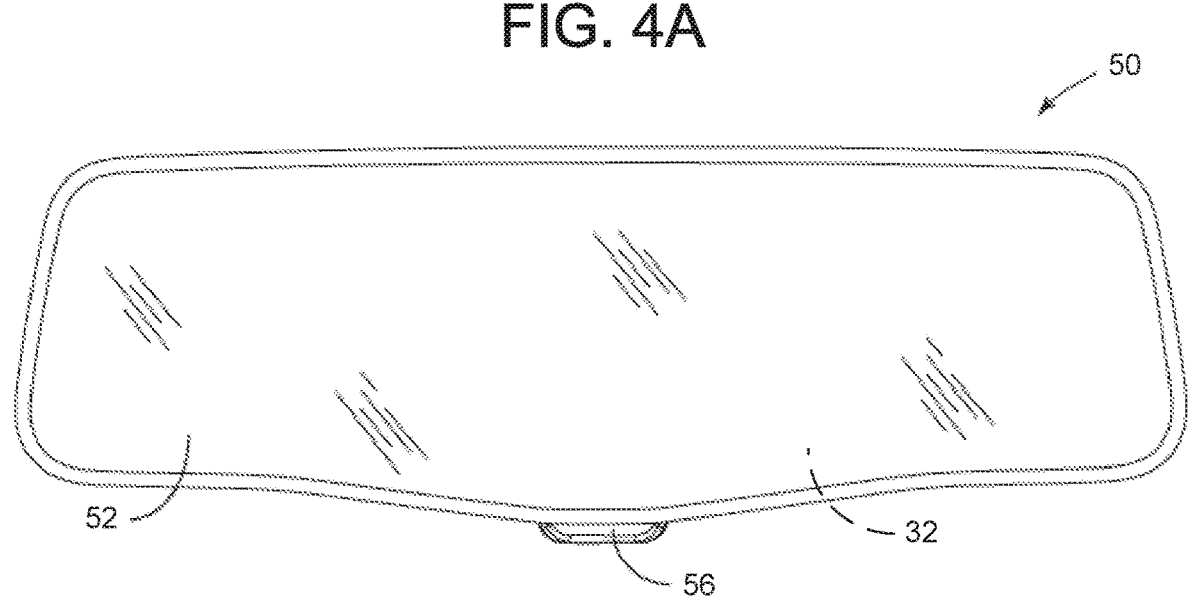
FIG. 4B is a front elevational view of the vehicle rearview assembly shown in FIG. 4A.

FIGS. 4A and 4B show an example of a rearview assembly 50 having a housing 54 with a display 32 and an optional mirror element 52 positioned in front of the display 32. A user switch 56 may optionally be provided for tilting of the mirror element 52 and/or display 32 to reduce glare on the display 32 when activated. Examples of such a rearview assembly 50 are known and are disclosed in commonly-owned U.S. Patent Application Publication Nos. 2015/0219967 A1, 2015/0266427 A1, and 2015/0277203 A1, the entire disclosures of which are incorporated herein by reference. The optional ambient light sensor 34 and a direct glare sensor 36 may be incorporated in rearview assembly 50 as is known in the art. Further, image processing unit 30 may be disposed in the rearview assembly 50. Rearview assembly 50 may be an interior rearview assembly as shown in FIGS. 4A and 4B, or may be an exterior rearview assembly.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A display system for a vehicle equipped with a camera for supplying streamed video images of a scene rearward of the vehicle, the display system comprising:
   an image processing unit for receiving the streamed video images and processing the streamed video images; and
   a display for displaying the processed streamed video images,
   wherein to perform processing of the streamed video images, the image processing unit is configured to:
      detect amplitude-modulated light sources in the streamed video images,
      classify the detected amplitude-modulated light sources into one of several possible classifications, and
      process the detected amplitude-modulated light sources differently based upon the classification of the amplitude-modulated light source including:
         select the streamed video images in which an amplitude-modulated light source is detected that flickers based upon the classification of the amplitude-modulated light source, and
         modify the selected streamed video images to correct for flicker of any amplitude-modulated light sources in the selected streamed video images.

2. The display system of claim 1, wherein the image processing unit modifies the selected streamed video images such that the pixels representing each of the detected amplitude-modulated light sources are maintained at a state so that when the processed streamed video images are displayed, each of the detected amplitude-modulated light sources that is represented by the pixels appears to have no perceivable flicker.

3. The display system of claim 2, wherein each of the detected amplitude-modulated light sources are maintained by substituting low pixel values from off periods with higher pixel values from on periods.

4. The display system of claim 1, wherein the image processing unit is further configured to track the detected amplitude-modulated light sources through image frames of the streamed video images.

5. The display system of claim 4, wherein the image processing unit modifies the selected streamed video images such that the pixels representing each of the detected amplitude-modulated light sources are maintained at a state so that when the processed streamed video images are displayed, each of the detected amplitude-modulated light sources that is represented by the pixels appears to have no perceivable flicker and appears at the expected locations in the images based upon the tracking of each of the detected amplitude-modulated light sources.

6. The display system of claim 1, wherein the image processing unit does not modify the streamed video images to correct for flicker from light sources classified as a turn signal or emergency vehicle light.

7. The display system of claim 1, wherein the image processing unit classifies the detected amplitude-modulated light sources into at least two classes where a first class of detected amplitude-modulated light sources has a flicker not perceivable by a human when viewed directly by the human, and a second class of detected amplitude-modulated light sources has a flicker that is perceivable by a human when viewed directly by the human.

8. The display system of claim 7, wherein the streamed video images in which an amplitude-modulated light source is detected that is classified in the first class is modified by substituting pixels representing each of the detected amplitude-modulated light sources that is classified in the first class such that the pixels representing each of the detected amplitude-modulated light sources are always at a state so that when the processed streamed video images are displayed, the detected amplitude-modulated light source that is classified in the first class appears to have no perceivable flicker.

9. The display system of claim 7, wherein the image processing unit classifies the detected amplitude-modulated light sources into the first class when a frequency of the flicker in the light sources is above a threshold frequency and classifies the detected amplitude-modulated light sources into the second class when a frequency of the flicker in the light sources is below the threshold frequency.

10. A rearview assembly for mounting to the vehicle, the rearview assembly comprising the display system of claim 1.

11. A display system comprising:
    an image processing unit for receiving streamed video images and processing the streamed video images; and
    a display for displaying the processed streamed video images,
    wherein to perform processing of the streamed video images, the image processing unit is configured to:
       detect amplitude-modulated light sources in the streamed video images,
       classify the detected amplitude-modulated light sources into at least two classes where a first class of detected amplitude-modulated light sources having a flicker not perceivable by a human when viewed directly by the human, and a second class of detected amplitude-modulated light sources having a flicker that is perceivable by a human when viewed directly by the human, and
       process the detected amplitude-modulated light sources differently based upon the classification of the amplitude-modulated light source including:

track the detected amplitude-modulated light sources through image frames of the streamed video images, modify the streamed video images in which an amplitude-modulated light source is detected that is classified in the first class by substituting pixels representing each of the detected amplitude-modulated light sources that is classified in the first class such that the pixels representing the detected amplitude-modulated light source are always at a state so that when the processed streamed video images are displayed, each of the detected amplitude-modulated light sources that is classified in the first class appears to have no perceivable flicker, and not modify the streamed video images to correct for flicker from light sources classified in the second class.

12. The display system of claim 11, wherein the image processing unit classifies the detected amplitude-modulated light sources into the first class when a frequency of the flicker in the light sources is above a threshold frequency and classifies the detected amplitude-modulated light sources into the second class when a frequency of the flicker in the light sources is below the threshold frequency.

13. The display system of claim 12, wherein each of the detected amplitude-modulated light sources are maintained by substituting low pixel values from off periods with higher pixel values from on periods.

14. The display system of claim 11, wherein light sources classified in the second class include turn signals and emergency vehicle lights.

15. A rearview assembly for mounting to the vehicle, the rearview assembly comprising the display system of claim 11.

16. A method of processing streamed video images comprising:

detecting amplitude-modulated light sources in the streamed video images;

classifying the detected amplitude-modulated light sources into at least two classes where a first class of detected amplitude-modulated light sources having a flicker not perceivable by a human when viewed directly by the human, and a second class of detected amplitude-modulated light sources having a flicker that is perceivable by a human when viewed directly by the human;

processing the detected amplitude-modulated light sources differently based upon the classification of the amplitude-modulated light source including:

tracking the detected amplitude-modulated light sources through image frames of the streamed video images;

modifying the streamed video images in which an amplitude-modulated light source is detected that is classified in the first class by substituting pixels representing each of the detected amplitude-modulated light sources that is classified in the first class such that the pixels representing the detected amplitude-modulated light source are always at a state so that when the processed streamed video images are displayed, each of the detected amplitude-modulated light sources that is classified in the first class appears to have no perceivable flicker; and not correcting the light sources classified in the second class for flicker.

17. The method of claim 16, wherein the detected amplitude-modulated light sources are classified into the first class when a frequency of the flicker in the light sources is above a threshold frequency and are classified into the second class when a frequency of the flicker in the light sources is below the threshold frequency.

18. The method of claim 16, wherein light sources classified in the second class include turn signals and emergency vehicle lights.

* * * * *